United States Patent [19]

Mikelsaar

[11] Patent Number: 4,812,128
[45] Date of Patent: Mar. 14, 1989

[54] THREE-DIMENSIONAL MOLECULAR MODEL

[75] Inventor: Raik-Khiio N. Mikelsaar, Tartu, U.S.S.R.

[73] Assignee: Tartussky gosudarstvenny Universitet, Tartu, U.S.S.R.

[21] Appl. No.: 638,478
[22] PCT Filed: Dec. 24, 1983
[86] PCT No.: PCT/SU82/00036
§ 371 Date: Jul. 19, 1984
§ 102(e) Date: Jul. 19, 1984
[87] PCT Pub. No.: WO84/02599
PCT Pub. Date: Jul. 5, 1984
[51] Int. Cl.$^4$ .................. G09B 27/02; G09B 23/26
[52] U.S. Cl. .................................. 434/278; 434/279
[58] Field of Search ........................... 434/278, 279

[56] References Cited
U.S. PATENT DOCUMENTS
2,962,820 12/1960 Petersen ............................. 434/278

OTHER PUBLICATIONS
Orbit Molecular Building System, 1971, pp. 9, 10 only.
Ealing Corp. flyer, Copyright 1971, CPK Precision Molecular Models, pp. 2, 3, 6, rear cover only.

Primary Examiner—MaryAnn Lastova
Assistant Examiner—V. Szczepanik
Attorney, Agent, or Firm—Lilling & Greenspan

[57] ABSTRACT

A three-dimensional molecular model comprises plastic modules, each representing on atom connected to one another. Modules intended to represent atoms of cyclic compounds are polyhedrons set in the model so that adjacent polyhedrons touch faces and have a common apex. The sum total of the angles formed by the adjacent faces of polyhedrons of the modules is more than 360°.

2 Claims, 2 Drawing Sheets

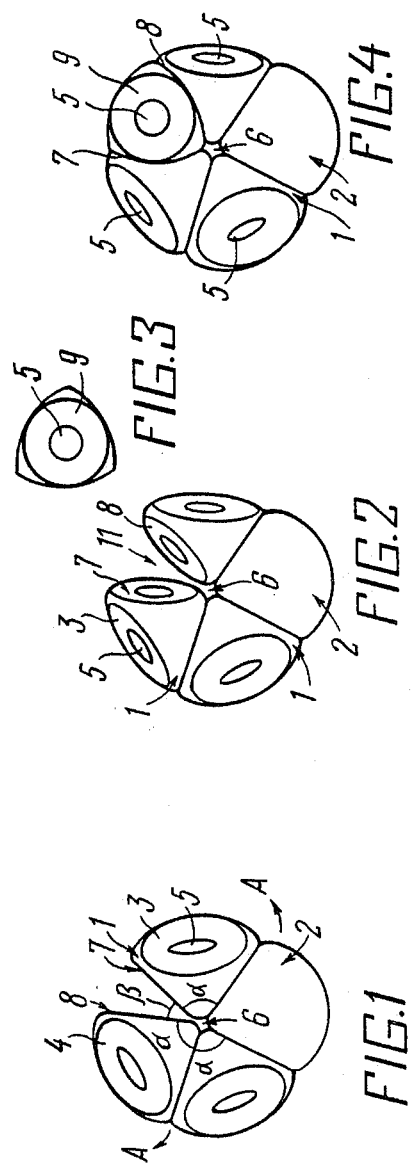

THREE-DIMENSIONAL MOLECULAR MODEL

FIELD OF THE INVENTION

This invention relates to scientific visual aids and is more particularly concerned with three-dimensional molecular models.

BACKGROUND OF THE INVENTION

Three-dimensional molecular models are modules made of plastic, for example, and connected to one another. Such modules can be made as hemispheres, cut-off spheres or polyhedrons. Each module represents an atom. The radius of a hemisphere represents the Van der waals atomic radius, while the distance from the center of the sphere to the cut-off plane is the covalent atomic radius. Connecting members of modules represent interatomic bonds while the angles between their geometric axes are valency angles. Conformal displacement of atoms is represented by turning individual modules or whole sets about connecting members.

Known in the art is a three-dimensional molecular model comprising hollow plastic modules made as hemispheres, cut-off spheres or polyhedrons. Each module is provided with one or several openings to fit conical elements of connecting members (cf., for example, U.S. Pat. No. 3,170,246 Cl. 35-18, 1965).

Also known in the art is a three-dimensional molecular model comprising plastic modules each representing one atom of a molecular structure. Modules are joined together by connecting members fitted into sockets of the modules. Plastic modules designed to represent atoms of cyclic compounds are made as regular polyhedrons whose faces are adjacent so that the model has one common apex (cf., for example, advertising booklet of the Ealing Corporation, South Natick, Mass., CPK Precision Molecular Models, 1980, pp. 27 and 30).

The above known three-dimensional molecular models are deficient in that they can represent only planar cyclic compounds. This is conditioned by the fact that, when models of cyclic compounds are put together, the centers of modules are located in one plane, which can be conditionally referred to as the cycle plane, and the sum of the angles formed by adjoining faces of the polyhedrons is equal to or less than 360°, so that a single atom or several atoms cannot be brought out of the cycle plane.

SUMMARY OF THE INVENTION

This invention is to provide a three-dimensional model of a molecular structure, wherein modules are made so that it becomes possible to represent aplanar cyclic compound structures.

There is provided a three-dimensional molecular model comprising plastic modules, each module represents one atom of a molecular structure, which are connected to one another, plastic modules which are intended to represent atoms of cyclic compounds are made as polyhedrons and placed in the model so that adjoining polyhedrons touch their faces and have a common apex, wherein, according to the invention, in order to provide an aplanar cyclic compound composed of at least three plastic modules, the plastic modules of this model are made so that the sum of the angles formed by adjoining faces of the module polyhedrons are more than 360°.

It is advisable that the plastic module representing atoms of cyclic compounds should be made as an irregular polyhedron.

BRIEF DESCRIPTION OF THE DRAWINGS

The invention will now be described in greater detail with reference to specific embodiments thereof and accompanying drawings wherein:

FIG. 1 is a perspective view of a three-dimensional molecular model;

FIG. 2 is a sequential view of the molecular model of FIG. 1 showing two modules turned in relation to their axes;

FIG. 3 illustrates a module of a molecular model;

FIG. 4 is a sequential view of the molecular model illustrated in FIG. 2 having an aplanar cyclic atomic bond;

DETAILED DESCRIPTION OF THE INVENTION

Figure 5A:
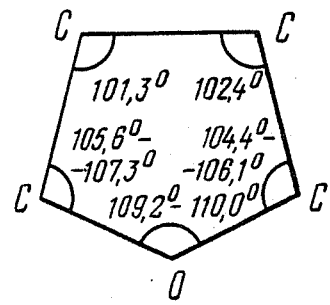
FIG. 5a is a schematic drawing of valency angles of deoxyribose and ribose molecules.

A three-dimensional molecular model comprises interconnected plastic modules 1 and 2 (FIGS. 1 and 2), each module representing one atom of a molecular structure. The modules 1 are approximately tetrahedrons whose faces 3 and 4 are provided with sockets 5 for connecting the modules to one another during assembly of the model. Modules 2 are hemispheres having parts of their surfaces cut off to form faces for contact with adjoining modules 1.

Referring to FIGS. 1 and 2, a part of a model comprises five adjoining modules, four of which have an approximately equal apex angle $\alpha$. All modules have a common apex 6. In order to put together a model of an aplanar cyclic compound composed of five modules having their centers in different planes, two modules 1 are turned about their axes where said modules are connected to adjacent modules in the direction of arrows A until the angle $\beta$ between faces 7 and 8 is sufficient to fit in a fifth module 9 (FIG. 3) which, in turn, is an irregular polyhedron whose faces adjoin at angles not equal to the angle $\beta$. FIG. 4 shows a three-dimensional molecular model having an aplanar cyclic atomic structure made as described above.

Figure 5B:
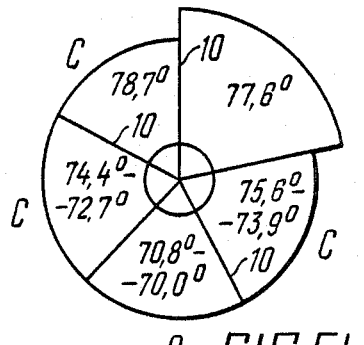
FIG. 5b is a schematic drawing of planar angles about the center of deoxyribose and ribose molecules.
Figure 6A:
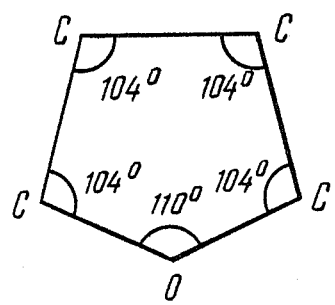
FIG. 6a is a schematic drawing of valency angles in a three-dimensional model of deoxyribose and ribose molecules.
Figure 6B:
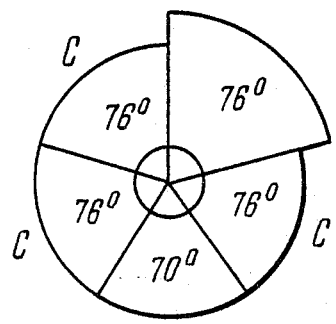
FIG. 6b is a schematic drawing of angles about the center of three-dimensional deoxyribose and ribose molecules.

FIGS. 5 and 6 demonstrates an example of finding valency angles for a deoxyribose and ribose molecule. Structural roentgenography has established that internal valency angles are equal to 101.3°, 102.4°, 104.4°–106.1°, 109.2°–110.0°, 105.6°–107.3° and their total amounts to 525°. The angles formed by the planes 10 around the molecule center are equal, respectively, to 78.7°, 77.6°, 75.6°–73.9°, 70.8°–70.0°, 74.4°–72.7° and their total is 375°. The model of such a molecule has valency angles of 104° and 110° with a total of 526°, the sum of angles at the molecular center being 374°, which is composed of angles of 76° and 70°.

The molecular model having an aplanar cyclic structure connection is formed as follows.

Four modules 1 and 2 are connected to one another, then two of these are turned about their axes of connection in one direction. The space 11 (FIG. 2) thus formed is used to fit the fifth module 9 so that it becomes somewhat prominent in relation to other modules.

Industrial Applicability

This invention can be used for scientific research and instructive purposes to present a three-dimensional structure of molecules and their transformations. The invention is used for deciphering and interpretation of initial data obtained by structural crystallography of chemical substances and to find their most probable structural states.

I claim:

1. A three-dimensional molecular model comprising at least three plastic modules having a polyhedral shape connected together to simulate atoms of aplanar cyclic compounds having no more than five constituent elements in each of said cyclic compounds and wherein adjacent plastic modules are arranged in said molecular model with faces touching, having a common apex, and having a sum of angles formed by said faces of said adjacent plastic modules equaling more than 360°.

2. A three-dimensional molecular model according to claim 1, wherein said plastic modules representing said atoms of said cyclic compounds have an irregular polyhedral shape.

* * * * *